US007473397B2

(12) United States Patent
Griffin et al.

(10) Patent No.: US 7,473,397 B2

(45) Date of Patent: Jan. 6, 2009

(54) DEVICE FOR CHEMICAL OR BIOCHEMICAL ANALYSIS

(75) Inventors: Neil Griffin, Cambridge (GB); Nicki Sutton, Cambridge (GB); Allan Carmichael, Herts (GB); Sam Charles William Hyde, Cambridge (GB); John Matthew Somerville, Herts (GB)

(73) Assignee: The Technology Partnership PLC, Herts (GB)

( * ) Notice: Subject to any disclaimer, the term of this patent is extended or adjusted under 35 U.S.C. 154(b) by 0 days.

(21) Appl. No.: 10/497,854

(22) PCT Filed: Dec. 12, 2002

(86) PCT No.: PCT/GB02/05636

§ 371 (c)(1), (2), (4) Date: Nov. 17, 2004

(87) PCT Pub. No.: WO03/049860

PCT Pub. Date: Jun. 19, 2003

(65) Prior Publication Data

US 2005/0272169 A1 Dec. 8, 2005

(30) Foreign Application Priority Data

Dec. 13, 2001 (GB) ................................ 0129816.5

(51) Int. Cl.

| | |
|---|---|
| ***G01N 21/00*** | (2006.01) |
| ***G01N 21/03*** | (2006.01) |
| ***G05D 16/00*** | (2006.01) |
| ***F15C 1/04*** | (2006.01) |
| ***G01L 27/00*** | (2006.01) |

(52) U.S. Cl. ......................... 422/57; 436/165; 422/112; 137/825; 73/1.72

(58) Field of Classification Search .................. 422/57, 422/112; 436/165; 137/825; 73/1.72
See application file for complete search history.

(56) References Cited

U.S. PATENT DOCUMENTS

| | | | | |
|---|---|---|---|---|
| 2,808,966 | A * | 10/1957 | Hall et al. | 222/207 |
| 3,799,742 | A | 3/1974 | Coleman | |
| 4,965,047 | A * | 10/1990 | Hammond | 422/58 |
| 5,147,337 | A * | 9/1992 | Plone | 604/306 |
| 5,229,297 | A | 7/1993 | Schnipelsky et al. | |
| 5,290,518 | A * | 3/1994 | Johnson | 422/58 |
| 5,843,793 | A * | 12/1998 | Belly et al. | 436/514 |
| 2002/0185184 | A1* | 12/2002 | O'Connor et al. | 137/822 |

FOREIGN PATENT DOCUMENTS

EP 0 157 579 10/1995

* cited by examiner

*Primary Examiner*—Jill Warden
*Assistant Examiner*—Lore Ramillano

(57) ABSTRACT

A device for analysis of a sample, the device comprising: a first layer having a network of passages and chambers through which fluid is caused to flow during analysis; a second layer in which a plurality of chambers are formed, the chambers containing fluids for use in the analysis; an inlet in either the first or the second layer into which a sample to be analysed can, in use, be placed, and a third layer providing a frangible fluid seal between the chambers of the second layer and the network of the first layer so that, in use, a break in the third layer permits fluid from a chamber in the second layer to pass into the network of the first layer to enable analysis of the sample to be carried out.

15 Claims, 11 Drawing Sheets

DEVICE FOR CHEMICAL OR BIOCHEMICAL ANALYSIS

FIELD OF THE INVENTION

This invention relates to a device for chemical analysis of a sample and, in particular, to a microfluidic system suitable for carrying out a wide range of chemical and biochemical test protocols.

BACKGROUND OF THE INVENTION

It is well known to provide a device for chemical analysis of a sample in which the device is provided with a number of compressible chambers containing solid or liquid chemical or biochemical formulations such that, by compressing a number of the chambers in a particular sequence, the required chemical test can be carried out on a sample which has been inserted into the testing device. Such a device is typically hand-held and therefore the sample can be inserted into the testing device almost immediately after it has been obtained and the test performed. In this way, it is possible for a user of such a device to obtain the results of the test very quickly. Further advantages of using a microfluidic system are that small sample volumes can be used, compatible with, for example, finger prick blood samples, small reagent volumes are required, thereby leading to reduced cost for each test and small amounts of waste materials, which can be retained on or within the device. Furthermore, the devices provide a high surface area to volume ratio, thereby giving fast binding and reaction speeds. As the devices are typically compact, they are readily compatible for use, for example, in ambulances, in emergency rooms, at home or in GP surgeries.

For example, EP 0381501 discloses a cuvette for use in PCR technology and which confines all of the reagents within the device, thereby preventing errant DNA escaping the cuvette and contaminating further testing apparatus. The device includes multiple chambers which contain the reagents and, in use, the chambers are compressed by an external pressure means. The chambers are in fluid communication with a central mixing area through thin pathways such that compression of the chambers forces the required sample and reagents into the mixing chamber in a predetermined sequence. The device is comprised of two layers, both of which are at least partially shaped to provide the flexible chambers and the fluid pathways.

U.S. Pat. No. 3,476,515 discloses a flexible testing device having a plurality of compartments for storing reagents and for carrying out the necessary reaction. The chambers are pressure activated, in use, to expel the reagent from that chamber into a mixing chamber. The results of the reaction carried out in the mixing chamber can then be analysed by a further machine which measures the spectral characteristics with an appropriate photometer, such as a spectrophotometer or by measuring the thermal, chemical, physical, electrical or electrochemical properties of the end product of the reaction.

A further example of this type of device has been provided by i-STAT Corporation and is known by names such as i-Stat CG8+ cartridge. This device provides a series of sensors over which, in turn, a calibration fluid and a sample are passed. The calibration fluid is directed to the sensor from one region with one specific action and then the sample is directed to the same sensor from a different location with a second action.

It is important, however, that wet and dry reagents are kept apart prior to analysis so that they do not become contaminated, thereby adversely affecting the actual analysis which is to be carried out.

It is an aim of the present invention to provide a disposable device for chemical analysis of a sample which is simple to manufacture and easy to operate and which ensures that all the reagents are kept apart before analysis.

SUMMARY OF THE INVENTION

According to the present invention, there is provided a device for analysis of a sample, the device comprising:

a first layer having a network of passages and chambers through which fluid is caused to flow during analysis;

a second layer in which a plurality of chambers are formed, the chambers containing fluids for use in the analysis;

an inlet in either the first or the second layer into which a sample to be analysed can, in use, be placed, and a third layer providing a frangible fluid seal between the chambers of the second layer and the network of the first layer so that, in use, a break in the third layer permits fluid from a chamber in the second layer to pass into the network of the first layer to enable analysis of the sample to be carried out.

Accordingly, the present invention provides a simple device in which the fluids that may be needed for analysis are retained in individual chambers sealed from the network of passages and chambers (fluidic network) of the first layer such that the wet reagents in the second layer and any dry reagents in the first layer are maintained on opposite sides of a seal. In this way, the integrity of the wet and dry components is not adversely affected prior to analysis.

The chambers in the second layer may be compressible, in order to increase the pressure within the chamber, thereby causing the third layer to rupture. Alternatively, the pressure within the chamber may be increased by means of, for example, an internal or external pump.

The device of the present invention may be used for chemical testing of a sample or, alternatively, in the preparation of a new sample, for example, DNA extracted from a blood sample.

The device may be provided with different combinations of chambers which can be actuated depending upon the sample inserted into the device. Additionally and/or alternatively, depending upon the result of a first test, one or more further optional tests may subsequently be carried out using the device.

The chambers in the second layer are preferably located so that they are opposite areas in the third layer which can be broken such that fluid is caused to flow into the fluidic network in the first layer. This may be achieved by providing weak points in the third layer at locations corresponding to the chambers in the second layer. Alternatively or additionally, at least one chamber in the second layer may include a means for piercing the third layer when the chamber is compressed. Alternatively or additionally, piercing means may be provided in the first layer, opposite at least one chamber in the second layer, such that the third layer is broken when the chamber is compressed.

One or more of the chambers in the second layer may project away from the substantially flat surface of the layer or, alternatively, one or more chambers may be recessed within the second layer. In the example whereby the chambers project from the surface of the second layer, the second layer is preferably thermoformed. It is preferred that the chamber is recessed within the second layer and covered by a flexible membrane, thereby increasing the reproducibility when dispensing the fluid from the chamber.

Preferably one or more of the chambers in the second layer is thermoformed and includes a compressible portion that projects away from the second layer, actuatable to bring the third layer into contact with a piercing means.

Preferably at least one of the chambers in the second layer is formed within the second layer, the chamber having a flexible upper portion which, when compressed, causes the third layer to be brought into contact with a piercing means, thereby rupturing the third layer.

Preferably at least one of the chambers in the second layer includes an axially movable member which, when moved by an actuating member, increases the pressure within the chamber, thereby bringing the third layer into contact with a piercing means in order to rupture the third layer.

The third layer may be of such a thickness that, when a predetermined first pressure is applied, the foil is caused to break, thereby allowing fluid from within the chamber to pass into the fluid network in the first layer. In order to reduce the pressure required to initiate breaking of the third layer, weak points, such as a laser ablated pattern, may be provided at desired locations on the third layer. Alternatively, the first layer may be provided with a piercing means, such as a pin, located beneath an associated chamber in the second layer to puncture the third layer. In this method, the piercing can either rely on the third layer bowing down on to the pin, a similar design to the pressure bursting design described above, or else incorporate a movable pin beneath the portion of the third layer to be punctured.

Alternatively, one or more of the chambers in the second layer may be formed by a pair of sub-chambers; a main sub-chamber containing the fluid and an auxiliary sub-chamber in fluid communication with each other via a relatively narrow passageway. In this example, the auxiliary sub-chamber retains some form of piercing means, preferably one of the mechanisms described above, such that piercing the third layer permits fluid to flow from the main sub-chamber through the narrow passageway, into the auxiliary sub-chamber and, via the break in the third layer, into the fluid network in the first layer.

A further example of a mechanism by which the third layer may be pierced is when a chamber may include a pin within the reagent storage chamber such that, as the chamber is compressed, the pin is caused to move towards and through the third layer, thereby permitting fluid from the chamber to flow into the first layer.

It is also envisaged that the third layer may be provided with a resistive heating element, typically screen printed on to one surface of the layer, such that, in use, the heating element is momentarily energised to burn away the third layer, thereby to open the chamber to the microfluidic network. Such a device would eliminate any mechanical connections and is potentially more reliable.

A further example of means for piercing the third layer include a claw, preferably having a wholly molded hinge portion within a chamber, or even a molded bung which has an interference fit with the third layer to provide a fluid tight seal, in such a way that by depressing the chamber, the bung is caused to permit fluid to flow into the first layer.

The third layer may be formed such that, when it has been pierced, the compressed chamber of the second layer interacts with the third layer to prevent fluid flow from the first layer to the second layer.

Alternatively, the chambers in the second layer may be resilient such that, after release of the aforementioned compression, they take up their original shape, thereby creating a negative pressure which reverses the fluid meniscus over the opening through the third layer and reduces unwanted fluid flow.

Since the mechanical compression of the chamber, or pressurisation by another means, can be reversed, for example by lifting up the plungers, the fluid can be sucked back from the first layer, containing the microfluidic network, into the second layer.

The chambers of the first layer, which may be opposite corresponding chambers within the second layer, may include dry reagents which may be provided for use during testing.

The first layer is preferably formed from a polymer or from glass although other suitable materials could also be used. The second layer may be formed partially or wholly from a polymer e.g. when the chambers are compressible, and/or from glass. The third layer is preferably a thin membrane formed from, for example, a metal foil and/or a polymer.

To ensure that a predetermined amount of fluid is dispensed when a chamber is compressed, it is necessary to know when the object doing the compressing, actuator or plunger, the fluid chamber actually touches the surface of the chamber. Due to manufacturing tolerances, this point may vary slightly between different microfluidic devices. This tolerance creates an uncertainty as to when the fluid will start to flow out of the chamber as well as the actual amount dispensed from the chamber at a given time. To counter this, it is desirable to sense when the actuator touches the surface of the chamber. This is preferably done by metalising the surface of the top of the chamber and placing two electrical contacts on the actuator. When the actuator touches the metalised membrane, an electrical connection is made between the contacts on the actuator, thereby signalling that contact has been made.

Preferably the first layer includes a reaction chamber, the shape of which is dependent upon the particular protocol under test, for example whether the test is designed to detect an end-point or a continuous reaction. However, it is also necessary for the design of the reaction chamber to take into account the required characteristics of the flow, timing of the reaction and position of the reagents within the fluidic network. Accordingly, the shape and size of the reaction chamber could be different for different reactions. For example, in an end-point reaction, the reaction chamber may be a thin disk, part or all of the surface of which has been coated with a particular reagent. The disk shape thereby provides a large surface area to volume ratio on which the reaction can take place. Alternatively, when a test incorporates a continuous reaction, the reaction chamber is preferably a long capillary pathway, preferably spiral in form to minimise the overall size of the testing device, thereby increasing the time taken for the reagents to pass through the chamber.

The reaction chamber may be formed separately from the rest of the device and, in that case, is then preferably co-molded into the fluidic network in the first layer. This is particularly advantageous if the antibody being placed in the reaction chamber requires any specific treatment which may affect the rest of the device or the reagents it contains.

The chamber may be textured or structured such that it introduces mixing and/or specific flow patterns into the fluids within the chamber. The reaction chamber may comprise a number of individual sub-chambers. The reaction chamber may contain an immobilising substrate, such as foam, on the surface of which an antibody may be immobilised.

The device may be provided with more than one reaction chamber, each of which can be coated with a different antibody so that multiple tests can be carried out on one sample. The chambers can be arranged either in series or in parallel depending upon the tests to be carried out.

The device is preferably provided with a waste chamber which may take the form of a long serpentine channel leading to a relatively large chamber which is vented to atmosphere. The volume of the waste chamber should be designed such that it is greater than the sum of the volumes of the reagent chambers so that, in theory, any waste material will not reach the vent port. By retaining any waste material on the device itself, this ensures that there is no risk of cross contamination between different test samples and helps to ensure that the waste material is handled and disposed of in a safe manner.

The waste chamber may be provided on the second layer such that the waste material is stored in or on the second layer.

When introducing samples and/or fluids into any of the chambers, or inserting a sample into the device, it may be advantageous for prototype development to provide fill ports through which the sample or reagent can be introduced. The fill ports may be covered by a silicone layer such that, by injecting a hypodermic syringe needle through the block to thereby introduce the fluid, removal of the needle permits the silicone to seal itself to maintain the fluid-tight integrity of the device. For high volume manufacturing it is preferential to introduce the reagents and other fluids at the manufacturing stage. One example of a fill process compatible with high volume manufacturing is to dispense the reagents and fluids into the upper layer prior to laminating the frangible layer, thereby sealing the reagents until the chambers are compressed.

According to the present invention, there is also provided a device for storing reagents and forming, in use, part of a device for analysis of a sample, the storage device comprising a planar body having:

a first layer having a plurality of compressible chambers in which fluid reagents for use in the analysis are stored; and a frangible second layer in sealing engagement with the first layer to retain and prevent contamination of the fluid reagents.

The above storage device may be bonded together with a further device for storing reagents and forming, in use, part of a device for analysis of a sample, the storage device comprising: a planar body having a first layer having a network of interconnecting passages and chambers in which one or more dry reagents for use in the analysis are stored and a frangible second layer in sealing engagement with the first layer to retain and prevent contamination of the dry reagents such that the frangible second layers of each device can be broken, in use, to allow fluid to flow from one device to the other, thereby forming a device for analysis of a sample. The devices may be bonded by means of an adhesive on either or both of the frangible second layers or, alternatively, they may be bonded, for example, by ultrasonic welding or may be mechanically coupled together such as by means of modified “male” and modified “female” luer fittings, which fittings additionally incorporate the frangible seal layer and which male fittings is able, on connection of said fitting, to rupture said frangible layer. Other forms of bonding or coupling may also be utilised but it is important to note that, after bonding or coupling, it is desirable that there is a fluid tight passageway between the two storage devices which have been brought together.

Additionally, the present invention also provides a method of forming a device for analysis of a sample, the method comprising the steps of:

forming a first part comprising a planar body having a first layer having a network of interconnecting passages and chambers which one or more dry reagents for use in the analysis are stored, and a frangible second layer in sealing engagement with the first layer;

forming a second part comprising a planar body having a first layer having a plurality of compressible chambers in which fluid reagents for use in the analysis are stored, and a frangible second layer in sealing engagement with the first layer; and joining the first and second parts in sealing engagement so that at least one of the chambers in the first part is opposite a chamber in the second part such that, in use, the frangible second layers can be broken to allow fluid to flow from the second part into the first part.

The first and second parts may be joined by means of an adhesive on either or both of the second layers, the adhesive being provided on regions of the second layers which are not to be broken during analysis and in such a way as to produce a fluid tight passage between the first and the second part. The individual parts may incorporate modified luer fittings as described above.

The individual parts may be provided, on the outwardly facing surface of the frangible second layers, with adhesive covered by a release film which can be removed to expose the adhesive prior to joining the first and second parts.

The separate parts of the device as described above ensure that the manufacture of a complete device for analysis is simple and easy to carry out. Furthermore, the different parts can be manufactured in different locations and brought together at a more convenient time.

The present invention also includes a method of analysing a sample in a device having a first layer having a network of passages and chambers, a second layer in which a plurality of compressible chambers are formed, the chambers containing fluid for use in the analysis, an inlet for a sample to be analysed, and a third layer providing a frangible fluid seal between the chambers of the second layer and the network of the first layer, the method comprising the steps of:

(a) inserting a sample to be analysed into the inlet;

(b) pressurising a chamber in the second layer to rupture the third layer such that the fluid from the chamber drives the sample into a reaction chamber into the network in the first layer;

(c) pressurising a third chamber in the second layer to rupture the third layer and drive another fluid into the reaction chamber;

(d) repeating step (c) until all the required fluids have been utilised and (e) analysing the reaction chamber.

The compression of the chambers in the second layer is preferably carried out by some form of motorised mechanical actuator such as a conventional motor driving a piston, a piezoelectric element driving a threaded piston or a stepper motor. Alternatively, the compression of the chambers could be carried out by a user.

The temperature of the device is preferably controlled by the instrumentation used to operate and read the results of any reaction. The type of temperature control may include local infrared heating, local conduction for cooling and heating of particular points, for example, by the use of peltier devices, and global temperature control for the whole device.

The analysis of the reaction in the reaction chamber is preferably carried out by additional read-out instrumentation which may be optical or electrical depending upon the nature of the test. Possible methods of reading could be detecting colour changes, fluorescence, chemi-luminescence, electrical charge, voltage or resistance. In all cases, the reading could be either a detection or measurement of the physical characteristic and, if the characteristic change is obvious, this may be observed by an operator of the device without the need for further read-out equipment.

The device of the present invention can be used in many different test protocols such as in an enzyme-linked immunosorbent assay (often referred to as ELISA) and/or direct fluorescence labelling.

BRIEF DESCRIPTION OF THE DRAWINGS

Examples of a device according to the present invention will now be described with reference to the accompanying drawings in which.

DESCRIPTION OF PREFERRED EMBODIMENTS

Figure 1:
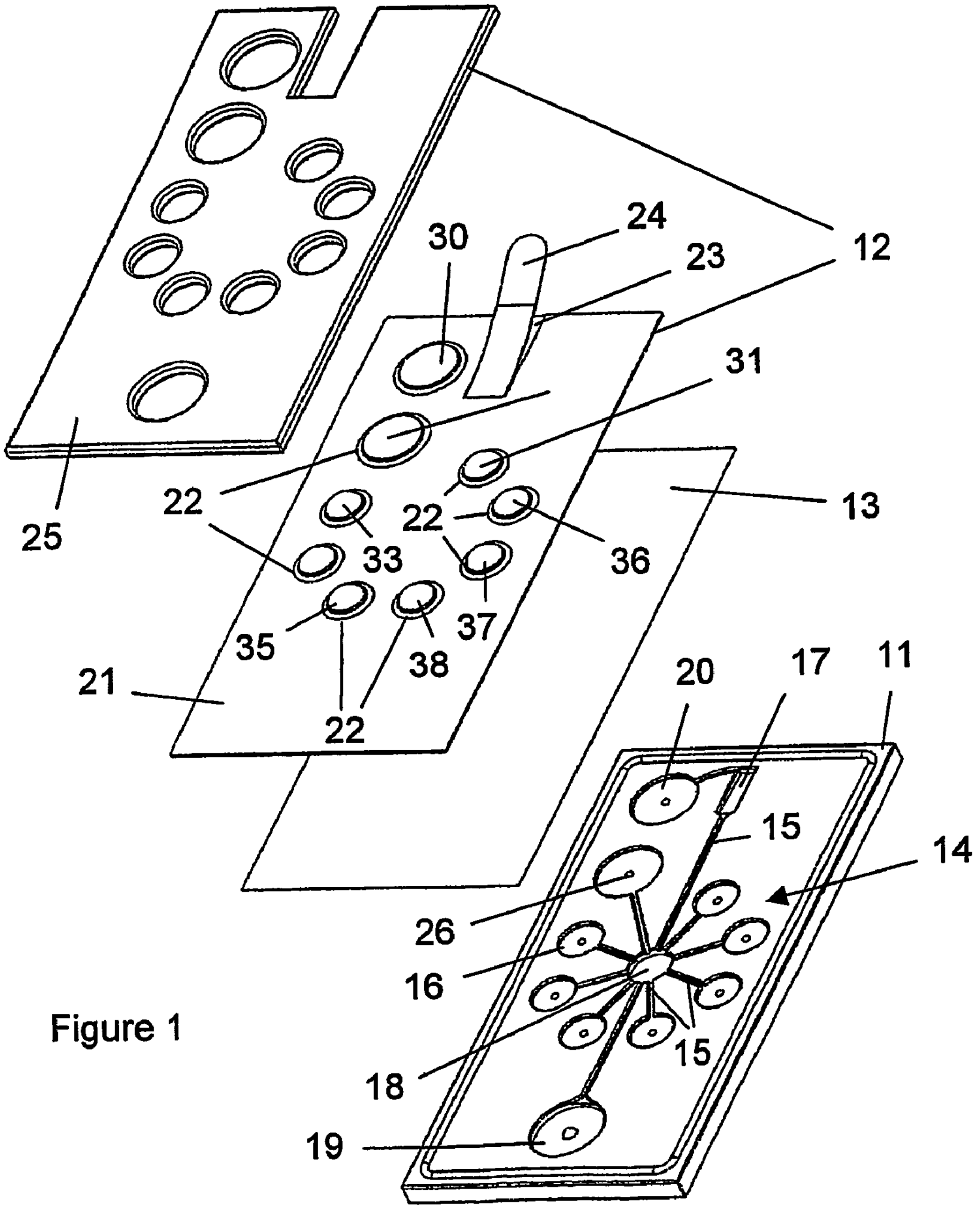
FIG. 1 shows an exploded schematic perspective view of a device according to the present invention.

The testing device 10 shown in FIG. 1 comprises a lower layer 11, an upper layer 12 and an intermediate layer 13.

The lower layer 11 is provided with a network 14 of passages 15 and chambers 16 through which fluids can be caused to flow during use. In particular, the lower layer 11 has a sample chamber 17 into which a sample to be tested can be inserted. The sample chamber 17 may be sized such that it permits only a known, measured volume of the sample to be inserted. A central reaction chamber 18 is in fluid communication with the sample chamber 17 and with a number of the chambers 16 to receive the necessary reagents and sample for the test or tests to take place. A waste reservoir 19 receives reagents once they have passed through the reaction chamber 18. A supply reservoir 20 is in fluid communication with inlet chamber 17 and is used to drive the sample into the reaction chamber 18. The volume of supply reservoir 20 may be such that it limits the amount of the sample which is driven from the inlet chamber 17 into the reaction chamber 18.

The upper layer 12 is comprised, in this example, of a flexible part 21 and a relatively rigid frame 25. In flexible part 21, a number of chamber collectively numbered 22, and individually identified as 30 to 38 inclusive, have been formed. These chambers 22 are located such that they are opposite chambers 16, 20 formed in the lower layer 11 and are constructed such that they are compressible. An inlet opening 23 is formed at one end of the flexible part 21 by a flap means 24 which is movable between a position which allows a sample to be inserted into chamber 17 of the lower layer 11 and a position in which it seals the inlet opening 23.

A relatively rigid frame 25 is the second part of the upper layer 12 and, although shown as an individual component in this example, could be formed integrally with the flexible part 21 and is merely provided to give the upper layer 12 some rigidity. Upper layer 12 could be formed from a single component. The frame 25 is provided with holes corresponding to the locations of the chambers 22, the flap 24 and waste reservoir 19.

The chambers 16 and the reaction chamber 18 can be treated with dry reagents or antibodies or any other required surface treatment to enable the specified reaction to take place.

Chambers 16 and reservoir 20 are provided with projections 26 upstanding from the centre portion of the chamber such that, in use, when the chambers 22 in the upper layer 12 are compressed, thereby pushing the membrane 13 into the respective chamber 16, 20 in the first layer, the projection pierces the membrane 13 to allow fluid from the relevant chamber in the upper layer 12 to flow into the fluid network 14 in the lower layer 11.

Flow control within the device is provided by two means. Firstly, the membrane 13 acts as a seal to prevent liquid reagents passing from the chambers 22 in the upper layer 12 into the fluid network 14 in the lower layer 11. Additionally, the fluids are moved within the fluid network by positive displacement of the chambers 22 in the upper layer 12. The flow rate and the volume of each fluid used are controlled by the rate of compression and the amount of displacement of the chambers 22 respectively. In order to correct for non-linearities in the collapse of materials, capillarity or particular geometries that do not provide a linear volume change with collapse, the compression can be adapted and controlled by a microprocessor (not shown).

The waste reservoir 19 is vented, optionally by means of a non-return valve to protect any reagents in layer 11 from contamination, to correct the pressure differentials within the device and to permit the liquid reagents to flow through the fluid network 14.

As an example test protocol, when analysing human serum for the prostate specific antigen, the reaction chamber 18 is coated with an antibody and the sample chamber is treated with a coagulant.

In this specific example the chambers 22 in the upper layer 12 contain, in individual chambers, zero buffer solution, water rinse, air, enzyme conjugate, tetramethylbenzidine (TMB) solution and hydrochloric acid.

To carry out a test, a sample of whole blood is placed in the sample chamber 17 and sealed closed using the flap means 24. The chamber 17 may be compressed to drive the sample into the reaction chamber 18, or alternatively chamber 30 is then compressed and its contents, which could be air or water, are used to drive the sample into the reaction chamber 18. A filter (not shown) may be used between the sample chamber 17 and reaction chamber 18. In particular this would be useful when testing blood to remove the cells to create plasma. Chamber 31 is then compressed to add zero buffer solution to the reaction chamber 18. Next, chamber 32 is compressed to rinse the reaction chamber 18. Chamber 33 is then compressed to supply air to evacuate the reaction chamber 18 so that the fluids are forced into waste reservoir 19. Chamber 34 is then compressed to add an enzyme conjugate, followed by the compression of chamber 35 which uses water to rinse the reaction chamber 18. Chamber 38 is then compressed to force air into the reaction chamber 18, emptying it into the waste reservoir 19. Chamber 37 is subsequently compressed and TMB solution is added. Chamber 36 is then compressed and hydrochloric acid is added to the reaction chamber. The reaction chamber 18 can then be measured spectrophotometrically at a wavelength of 450 nm.

Figure 2:
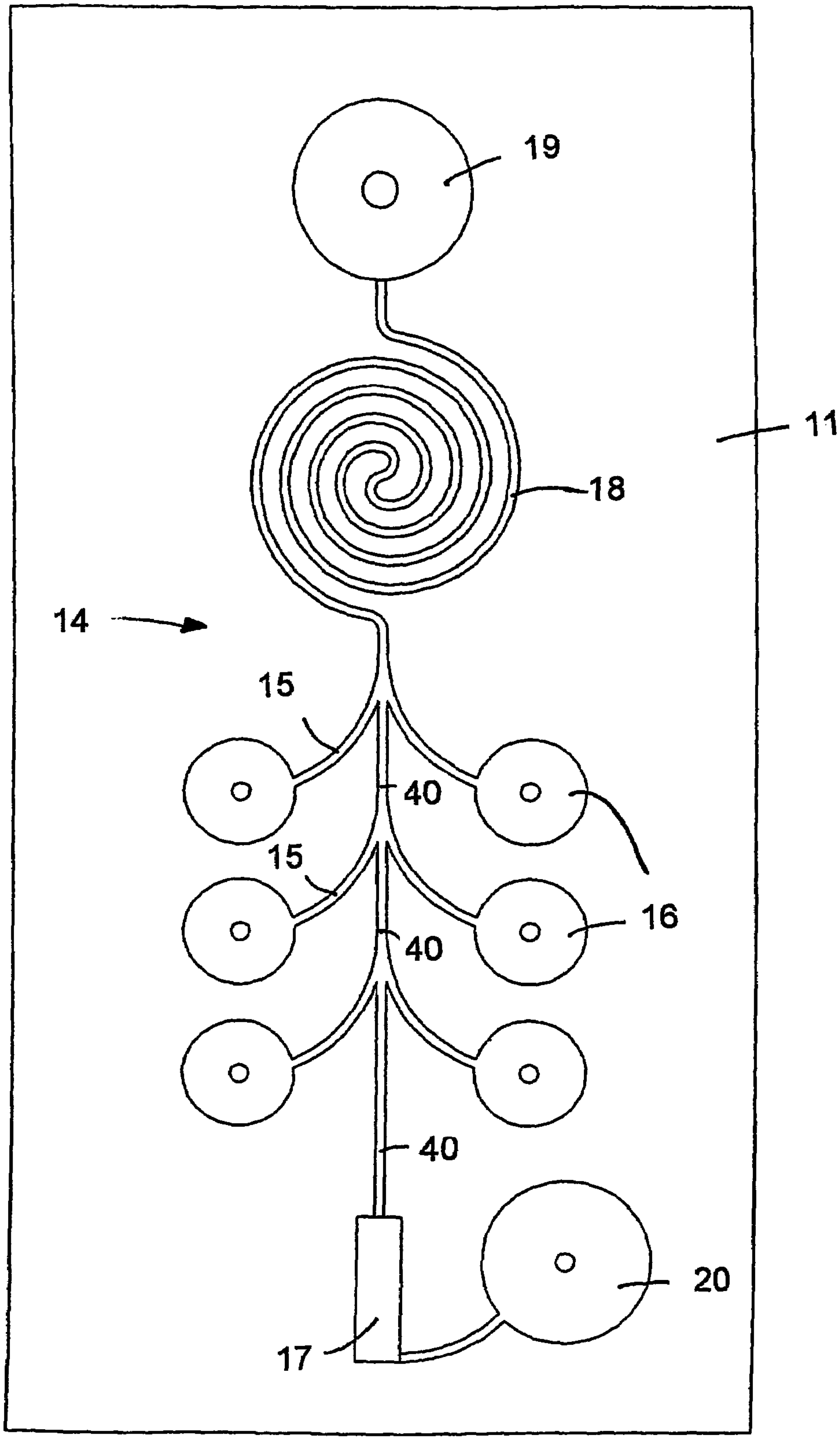
FIG. 2 shows an alternative fluidic network for use in the device of FIG. 1.

FIG. 2 shows an alternative arrangement of fluidic network 14 that can be used in the lower layer 11 of the testing device 10 of FIG. 1. The chambers 16 and passages 15 are similar to those of FIG. 1. The chambers 16 for receiving the necessary reagents are arranged such that they are fluid communication with a common pathway 40 which links the inlet chamber 17 and the reaction chamber 18. The reaction chamber 18 is, in this example, a long spiral pathway and this form of reaction chamber can be used when a continuous reaction is to be carried out. The length of the reaction chamber 18 depends upon the length of time required for the reagents to be in contact with any antibody or other chemical provided in the reaction chamber prior to testing. As in the previous example, the reaction chamber 18 empties into a waste reservoir 19.

Figure 3:
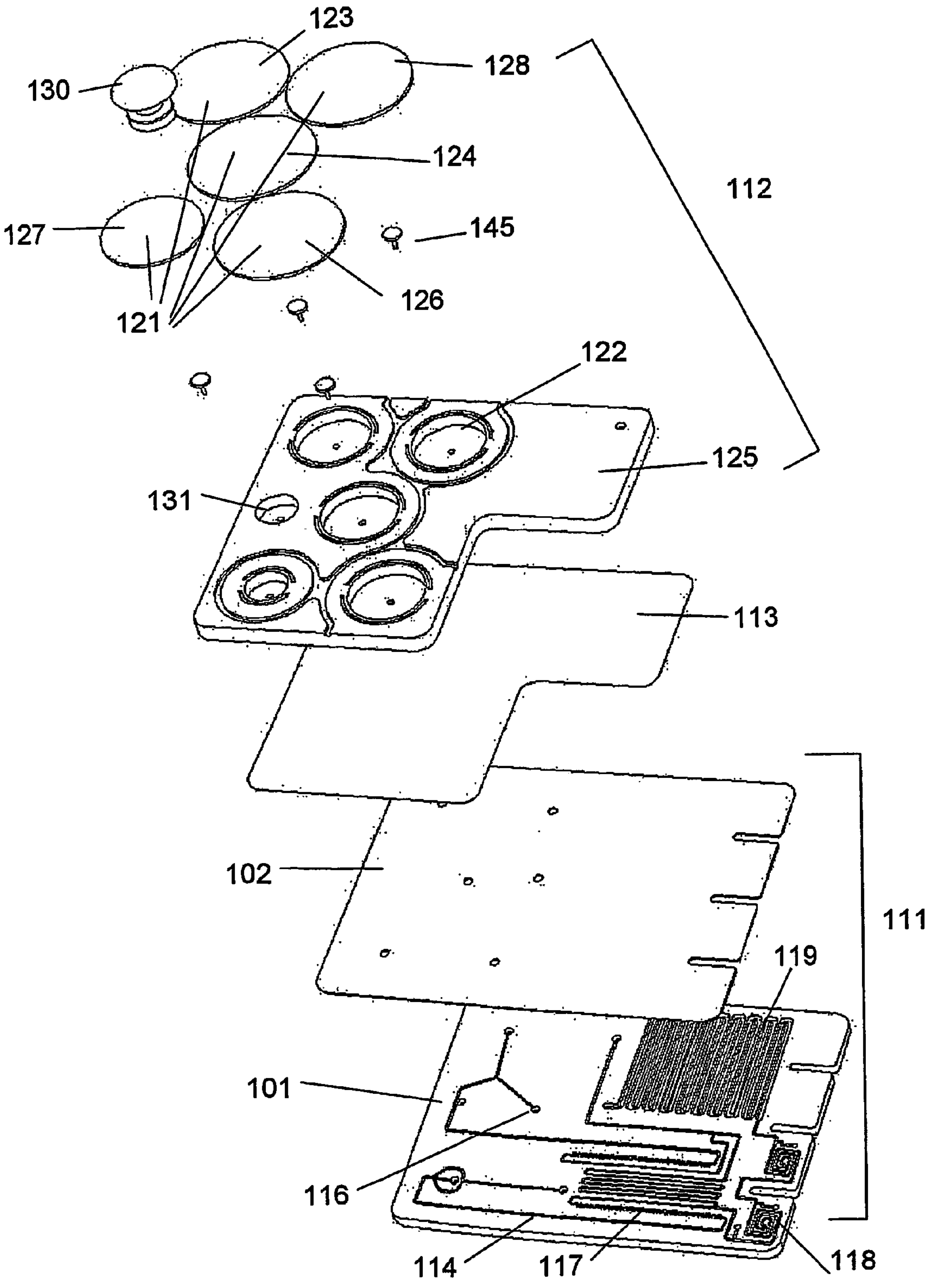
FIG. 3 shows an exploded view of an alternative embodiment of a device according to the present invention.
Figure 4:
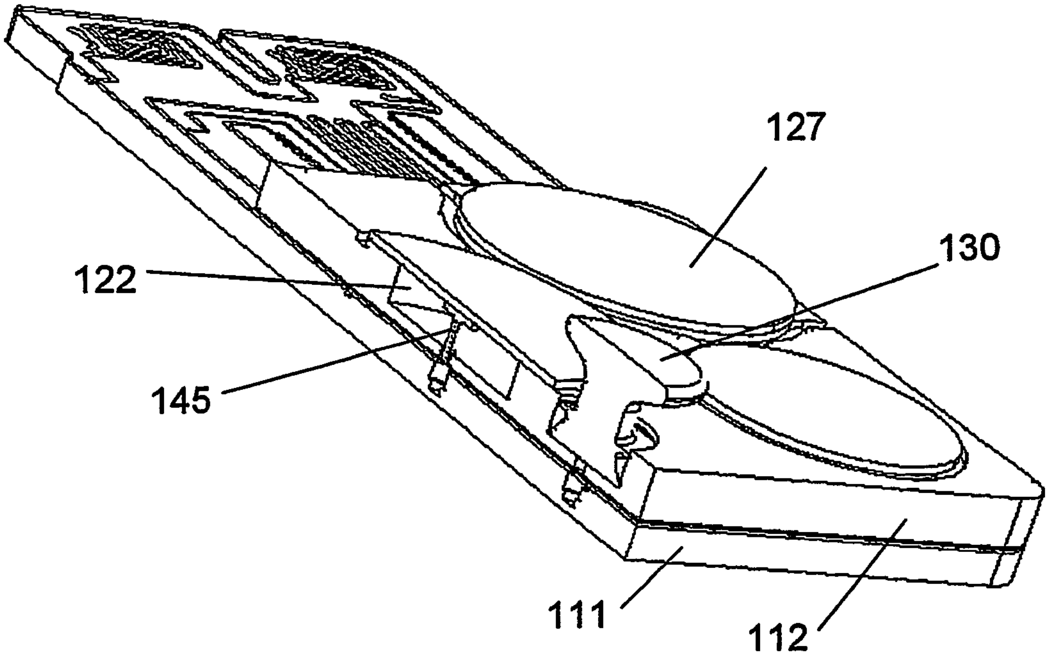
FIG. 4 shows a cross section through the device of FIG. 3.

FIGS. 3 and 4 show an alternative embodiment of the device, where the upper layer 112 containing the compressible chambers consists of a rigid part 125 and flexible parts 121 with several associated piercing pin mechanisms 145. Compression of the chamber 122 by the depression of membranes 121 causes the piercing pin 145 to penetrate the frangible membrane 113 allowing fluid to flow from the upper layer 112 into the lower layer 111.

The lower layer 111 consists of a laminate structure 101, 102. The bottom part 101 of the lower layer 111 consists of a network of fluidic passages 114, mixing elements 117, reaction chambers 118 and waste chambers 119. Layer 102 provides a sealing layer to the lower layer 111. In this embodiment, a sample may be introduced into chamber 131 which can be compressed using sample plunger 130.

In the embodiment in FIGS. 3 and 4, an example ELISA test, and specifically chemi-luminescent test, can be carried out by the insertion of the sample into the sample collection point 131. The sample plunger 130 is then inserted. Compression of the plunger forces the sample from the upper layer 112 into the lower fluidic network layer 111. In this process, the sample as forced through a filter to extract plasma. Chamber 127 is then compressed, thereby forcing the piercing pin 145 through the frangible membrane 113, allowing buffer solution to flow from the upper layer 112 to the lower layer 111. Compressing chamber 127 simultaneously as the sample plunger forces both fluids to flow through a microfluidic mixer element 117. Chamber 123 is then similarly compressed forcing a labelled antibody (antibody 1) solution to mix with the plasma-buffer solution. The antibodies bind to specific proteins in the plasma effectively labelling them. The compression of this chamber forces the mixed fluid to flow into the reaction chambers 118. The reaction chambers 118 are typically coated with a second antibody 2. As the mixed antibody 1—plasma solution flows through the chamber, specific binding of the labelled proteins to antibody 1 on the reaction chamber immobilises the labelled proteins. The residual proteins and unbound antibodies are washed away to waste chamber 119 by the compression of chamber 128 which forces a wash buffer from the upper layer to the lower layer and through the reaction chamber. Having washed the reaction chambers 118, leaving just the bound labelled protein, a chemi-luminescent agent can be flushed through the reaction chambers 118 causing the reaction chambers 118 to luminescence. The quantity of the luminescence is proportional to the bound labelled protein. Typically luminescent agents may include more than one component which require mixing before washing over the bound labelled protein. This is achieved in the embodiment in FIGS. 3 and 4 by including one component in each of chamber 124 and 126. The chambers are compressed simultaneously and the liquids are forced through into the lower layer and through a mixing element where the two components are thoroughly mixed. The continued compression of chambers 124 and 126 forces the mixed chemi-luminescent agent through the reaction chambers 118, causing luminescence of the bound proteins.

The following figures describe different chamber constructions and valves which could be utilised in either of the previously described embodiments.

Figure 5:
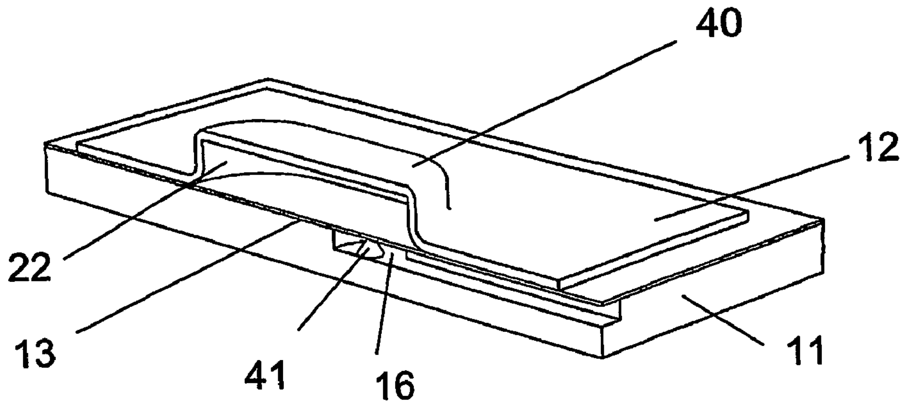
FIG. 5 shows one example of a compressible chamber for use in the present invention.

FIG. 5 shows a first example of a fluid retaining chamber 22 in the upper layer 12. The chamber is provided with a compressible portion 40. A piercing means, in the form of a cone 41 extends from the surface of chamber 16 in the lower layer 11.

Figure 6:
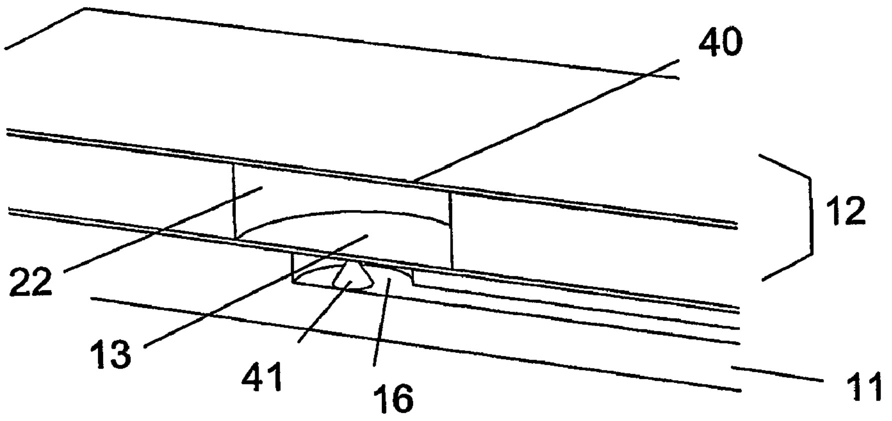
FIG. 6 shows a second example of a chamber for use in the present invention.

In a different example shown in FIG. 6, the chamber 22 is formed within the second layer 12 and is provided with a compressible portion 42. In both examples shown in FIGS. 5 and 6, by actuating the compressible portions 40, 42, the pressure inside the chamber is forced to increase, thereby forcing the frangible layer 13 to depress onto the cone 41, thereby rupturing the frangible seal 13.

Figure 7:
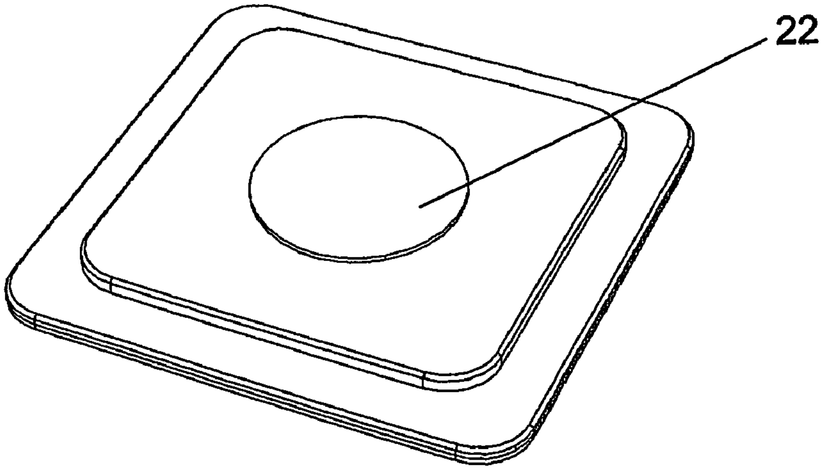
FIG. 7 shows a schematic perspective view of one example of a chamber for use in the present invention.
Figure 8:
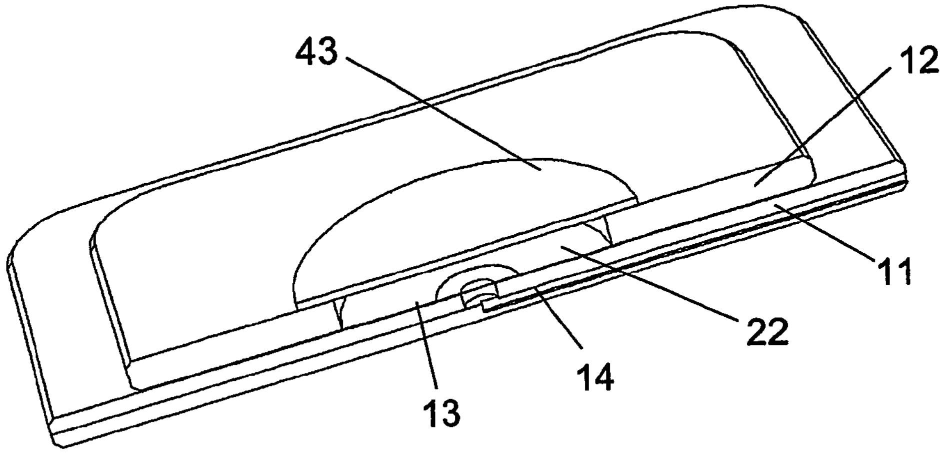
FIG. 8 shows a cross-sectional view through the example of FIG. 7.

FIGS. 7 and 8 show a further example of how a chamber 22 may be formed. In this example, the chamber 22 is formed within the upper layer 12 and is provided with a flexible cover portion 43. A frangible membrane 13 is provided between the upper layer 12 and lower layer 11 such that, when the compressible cover portion 43 is compressed, the increase in pressure within the chamber 22 causes the membrane 13 to rupture, thereby allowing fluid to flow into the network of passages 14 in the lower layer.

Figure 9:
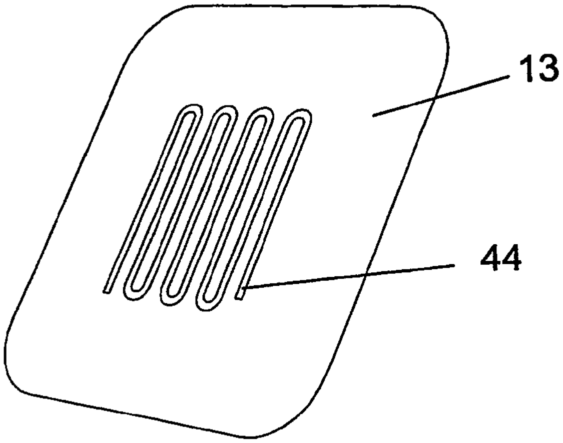
FIG. 9 shows a further example of the bursting mechanism for the third layer.
Figure 10:
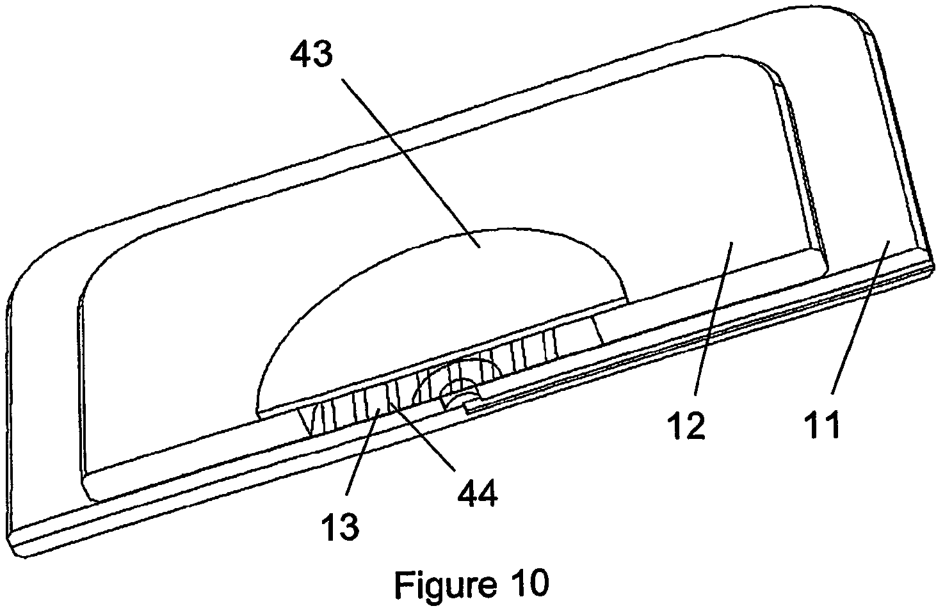
FIG. 10 shows a cross-sectional view through a chamber incorporating the membrane of FIG. 9.

In order that the membrane 13 is sufficiently weak that the increase in pressure can rupture it, the film may be provided, as shown in FIG. 9, with a weak portion, in this form a looped portion 44 which is preferably formed by laser ablation. Such a film can be incorporated, as shown in FIG. 10, in the device shown in FIG. 8 and is operated in the same manner.

Figure 11:
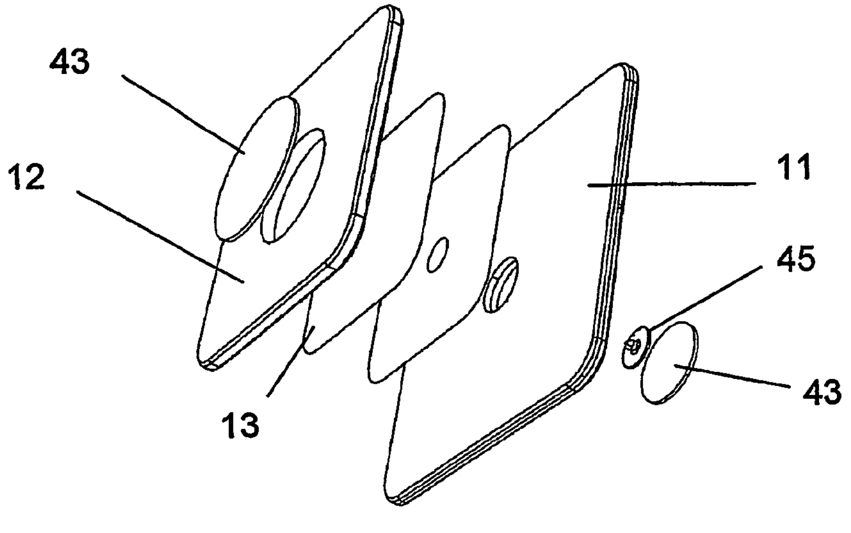
FIG. 11 shows an exploded perspective view of a further example of a chamber for use in the present invention.
Figure 12:
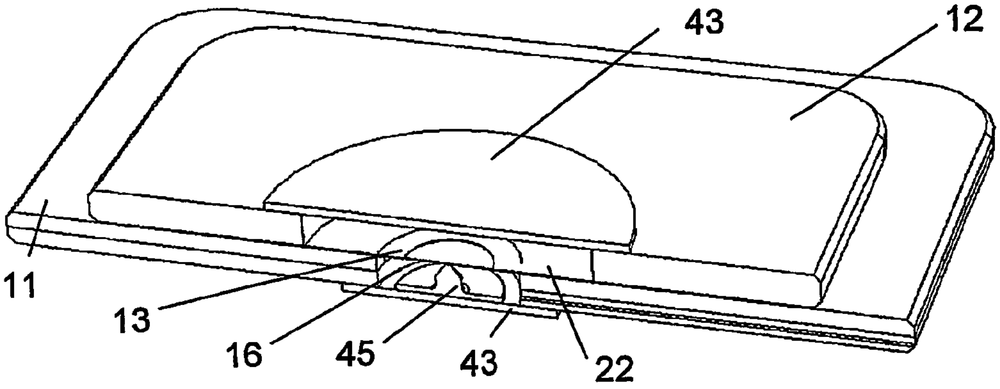
FIG. 12 shows a cross-sectional view through the example of FIG. 10.

FIGS. 11 and 12 show a yet further example of how the chambers may be formed. The chamber 22 is, again, formed in the upper layer 12 and a compressible cover portion 43, preferably formed from silicone, covers the upper portion of chamber 22. A chamber 16 is formed in the layer 11 and has a compressible cover portion 43*a*, from which a pin 45 projects. Compression of the portion 43*a* causes the pin to rupture the layer 13 so that subsequent compression of the portion 43 forces fluid from the chamber 22 into the network of passages in the layer 11.

Figure 13:
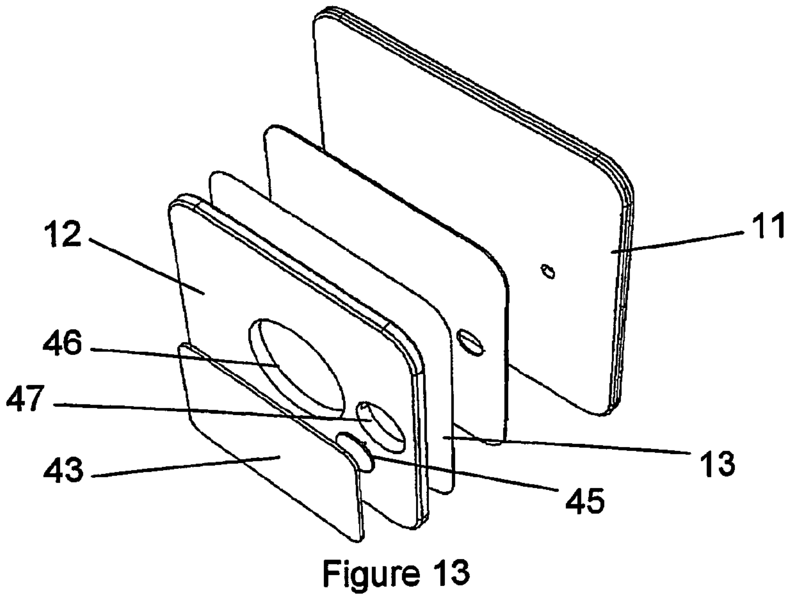
FIG. 13 shows an exploded perspective view of a further example of a chamber for use in the present invention.
Figure 14:
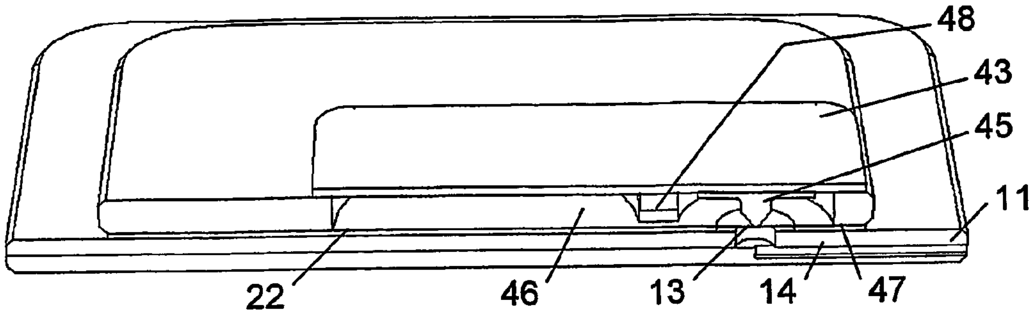
FIG. 14 shows a cross-sectional view through the chamber of FIG. 13.

FIGS. 13 and 14 show a yet further example in which the chamber 22 is formed from a pair of sub-chambers 46, 47. The main sub-chamber 46 contains the desired fluid and the auxiliary sub-chamber retains a pin 45 which, when the compressible silicone cover layer 43 is compressed, pierces the frangible seal 13, thereby allowing fluid from main sub-chamber 46 to flow through passageway 48 into the auxiliary sub-chamber 47 and into the fluid network 14 in the lower layer 11.

Figure 15:
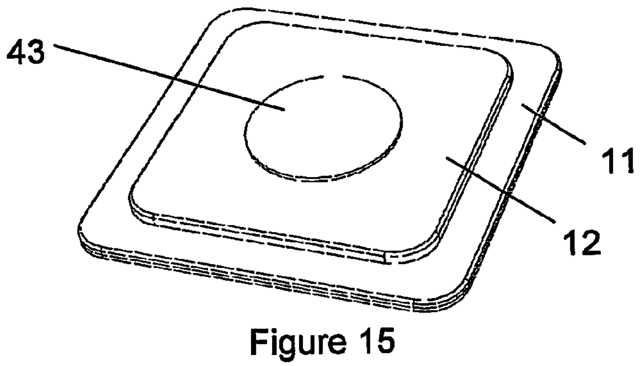
FIG. 15 shows a schematic perspective view of a further example of a chamber for use in the present invention.
Figure 16:
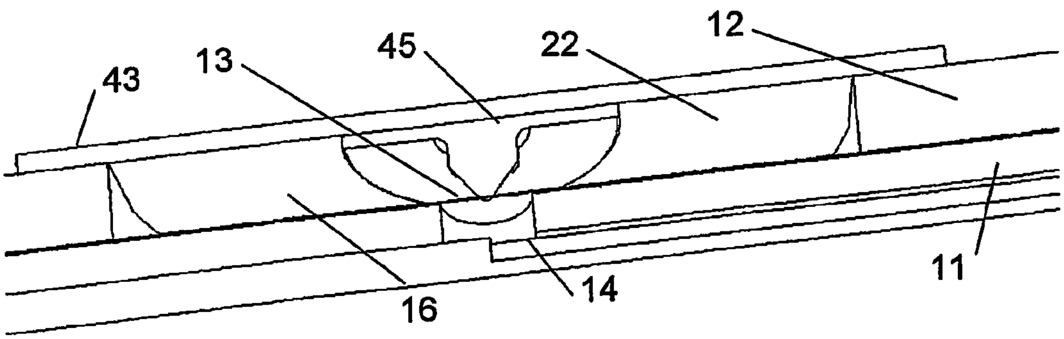
FIG. 16 shows a cross-sectional view through the example of FIG. 15, from below and one side.

FIGS. 15 and 16 show a further example in which the chamber 22 retains a pin 45, in a similar manner to that within the auxiliary sub-chamber 47 of FIGS. 13 and 14, such that depression of the silicone cover layer 43 causes the pin to pierce the frangible seal 13, allowing fluid to flow from the chamber 22 into the fluid network 14 in the lower layer 11.

Figure 17:
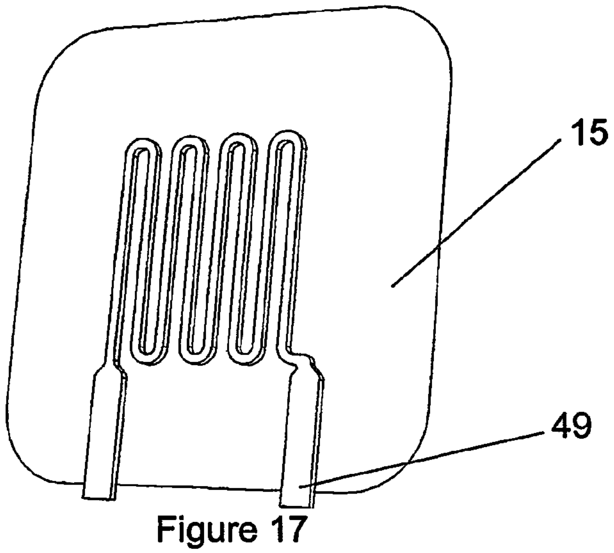
FIG. 17 shows one example of a membrane for use as the third layer.
Figure 18:
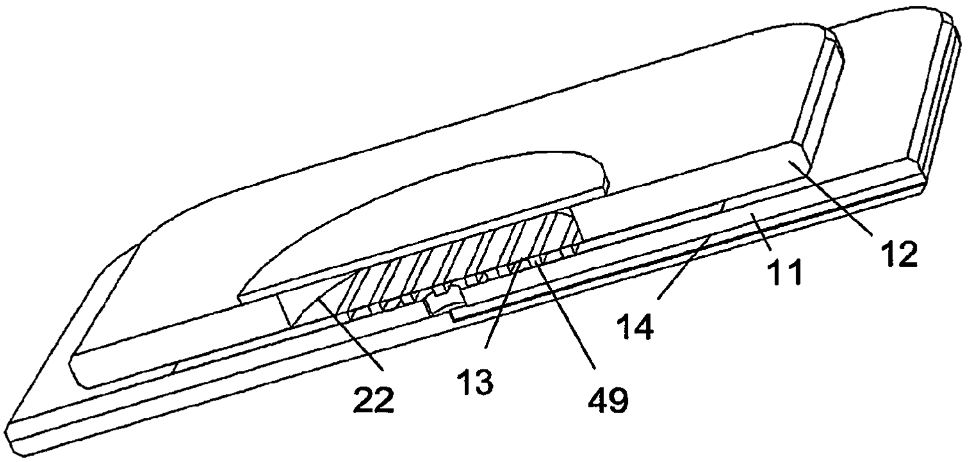
FIG. 18 shows a perspective cross-sectional view through part of a device incorporating the film of FIG. 17.

FIGS. 17 and 18 show a frangible seal 13 onto which a resistive heating element 49 has been printed, preferably by screen printing, such that, in use, the element would be energised for a short time to burn away the film 13, thereby opening the chamber 22 to the fluid network 14 in the lower layer 11.

Figure 19:
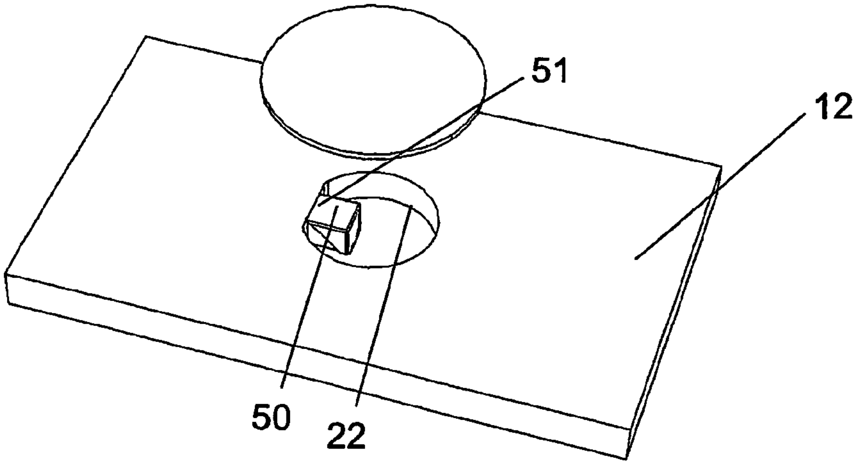
FIGS. 19 and 20 show a further example of a mechanism for piercing the third layer.
Figure 20:
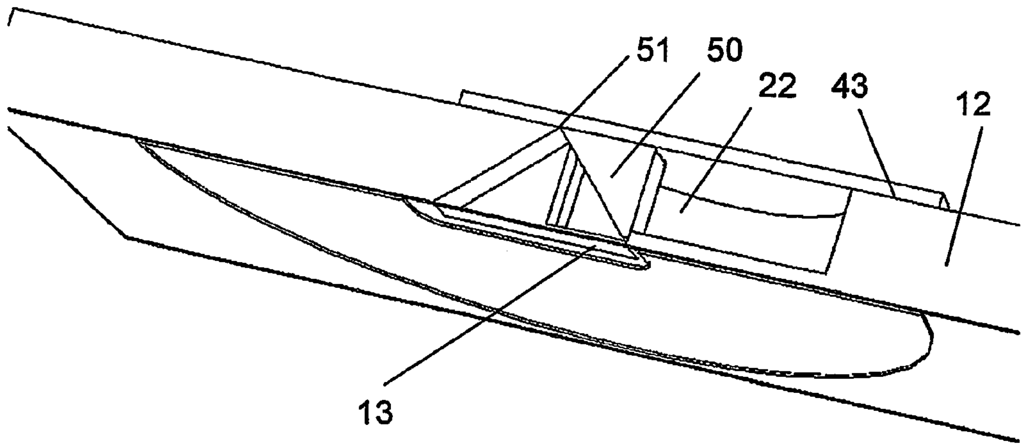

FIGS. 19 and 20 show perspective views of a further example of a chamber 22, in which a claw 50 is shown, in FIG. 20 in the open position and in FIG. 19 in the closed position, having a hinged portion 51. By moving the claw 50 about the hinge portion 51, it is caused to pierce the frangible seal 13, thereby allowing fluid from chamber 22 to pass into the lower layer 11 (not shown).

Figure 21:
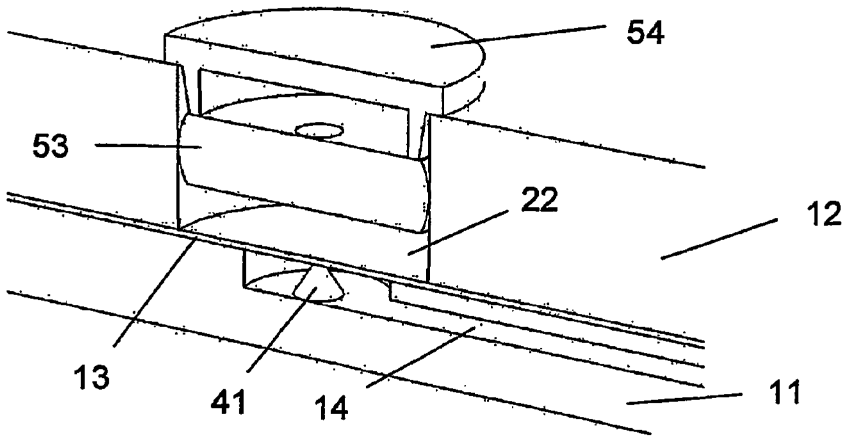
FIG. 21 shows a cross sectional view through another example of a chamber for use in the present invention.

FIG. 21 shows chamber 22, recessed in the layer 12, and including a micro syringe 52. The micro syringe 52 includes a slidably mounted piston 53 which can be pushed down using actuator 54 to compress the fluid in the chamber, whilst maintaining a fluid tight seal to the chamber sides. As the volume within the chamber is reduced, the third layer 13 is caused to bow into contact with the piercing means 41, thereby rupturing the third layer and allowing fluid to flow into the network of passages 14 in the first layer 11.

Figure 22:
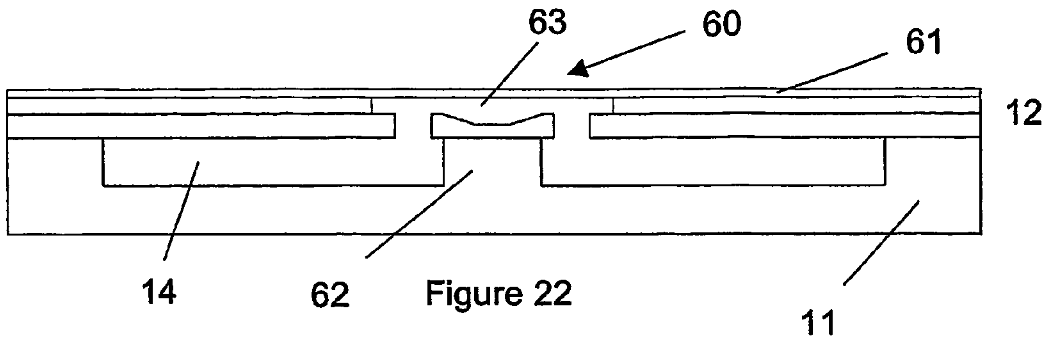
FIGS. 22 and 23 show schematic cross sectional views through one portion of a device according to the present invention utilising a valve mechanism.
Figure 23:
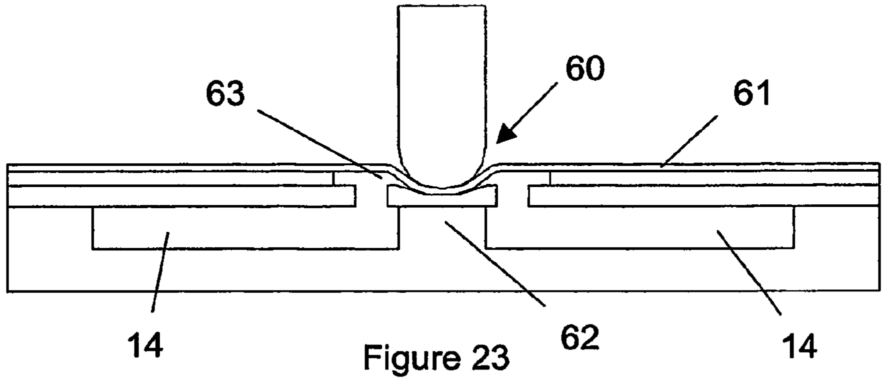

FIGS. 22 and 23 show a top surface valve 60 for a portion of the device in which the upper surface of the device is formed by an elastomeric membrane 61. Fluid is routed from the network 14 in the first layer 11 back into the second layer 12 through a small channel 63 formed between a projection 62 in the first layer, which extend into the second layer, and the membrane 61. Thus, when the elastomeric membrane is compressed as shown in FIG. 22, the passageway 63 between the two portions of the fluidic network 14 is blocked, thereby preventing flow within the network of passages.

The invention claimed is:

1. A device for analysis of a sample comprising:

a first layer a having first surface and a plurality of first chambers extending away from the first surface, said first chambers comprising at least one reaction chamber or channel and a fluidic network comprising reagent chambers and channels, each reagent chamber or channel for receiving a corresponding reagent and each being in communication with the at least one reaction chamber via a corresponding channel to form a networked array of channels extending from each reagent chamber or channel to the at least one reaction chamber through which fluid is caused to flow in a controlled manner during analysis;

a second layer having a first dimensionally stable, rigid portion and second flexible portions, the rigid portion having an opening for each flexible portion, each flexible portion being deformable into the corresponding opening in the rigid portion, a second surface disposed in confronting relationship with the first surface and having a plurality of fluid chambers formed therein extending away from the second surface and the first layer, each fluid chamber and a corresponding reagent chamber or channel being aligned in pairs in opposition to each other, each of the fluid chambers containing an amount of a fluid for use in the analysis;

at least one of the first and second layers having an inlet in flow communication with the at least one reaction chamber, for receiving at least a portion of the sample to be analysed; and a third layer disposed between the first and second surfaces of the respective first and second layers for sealing the surfaces of the first, second and third layers together in said confronting relationship, and said third layer having a frangible, fluid impervious area disposed between each pair of fluid and reagent chambers, each said frangible area being breakable to permit fluid from the fluid chamber to be driven into the paired reagent chamber or channel for communication to the at least one reaction chamber, wherein each of the flexible portions of the second layer has an actuator portion formed therein, said actuator portions being spaced away from the first surface and said second layer, each of said actuator portions formed of a flexible material covering the rigid portion of the fluid chambers, such that the actuator portion of each of the plurality of said fluid chambers is deformable under a force applied against the actuator portion from an undeformed initial shape spaced from the surface of the first layer to a deformed shape closer to the surface of the first layer for initiating breakage of the frangible area and resulting in displacement of the fluid in a direction from the fluid chamber to the corresponding reagent chamber or channel and to the network of channels in communication with the at least one reaction chamber, each actuator portion controllably deflecting inwardly of the chamber towards the third layer when the force is applied, thereby resulting in said controlled flow of the liquid.

2. A device according to claim 1, wherein the reagent chambers in the first layer are opposite the fluid chambers in the second layer resulting in opposite areas in the third layer therebetween which can be broken such that fluid is caused to flow into the network of reagent channels and chambers in the first layer.

3. A device according to claim 2, wherein weak points are provided in the opposite areas in the third layer at locations corresponding to the fluid chambers in the second layer.

4. A device according to claim 1, wherein at least one of the plurality of fluid chambers in the second layer includes a piercing device for piercing the third layer when the first layer is compressed.

5. A device according to claim 1, wherein a piercing device is provided in the first layer, opposite at least one of the fluid chambers in the second layer such that the third layer is broken when the at least one of the fluid chambers is compressed.

6. A device according to claim 1 wherein the frangible fluid seal provided by the third layer has been broken, the fluid chamber of the second layer interacts with the third layer to prevent fluid flow from the first layer to the second layer.

7. A device according to claim 1, wherein the first layer is formed from either a polymer or glass.

8. A device according to claim 7, wherein the actuator portion of the second layer is formed partially or wholly from a polymer.

9. A testing device according to claim 1, wherein the third layer is formed from either a metal foil or a polymer or a combination of the two.

10. A device according to claim 1, wherein one or more of the fluid chambers in the second layer is thermoformed and includes a compressible portion that projects away from the second layer, actuatable to bring the third layer into contact with a piercing means.

11. A device according to claim 1, wherein at least one of the fluid chambers in the second layer is formed within the second layer, with a flexible upper portion which, when compressed, causes the third layer to be brought into contact with a piercing means, thereby rupturing the third layer.

12. A device according to claim 1, wherein at least one of the fluid chambers in the second layer includes an actuating member and an axially movable member which, when moved by the actuating member, increases the pressure within the chamber, thereby bringing the third layer into contact with a piercing means in order to rupture the third layer.

13. The device according to claim 1 wherein the actuator portion at least partially recovers when the force is withdrawn for partially reversing the direction of the displacement of the fluid, so that a limited amount of the fluid is displaced towards the reagent chamber thereby resulting in said controlled flow of the liquid.

14. The device according to claim 1 further comprising a sample chamber in flow communication between the inlet and each reagent chamber.

15. The device of claim 1 wherein the reagent chambers are dry prior to actuating the actuator portion of the second layer.

* * * * *